(12) United States Patent
Asano et al.

(10) Patent No.: US 6,276,513 B1
(45) Date of Patent: Aug. 21, 2001

(54) WORKPIECE HANDLING DEVICE

(75) Inventors: Kazuhiro Asano, Tochigi; Toru Okabe, Gunma; Kimio Nozaki, Kanagawa, all of (JP)

(73) Assignee: Calsonic-Kansei Corporation, Tokyo (JP)

( * ) Notice: Subject to any disclaimer, the term of this patent is extended or adjusted under 35 U.S.C. 154(b) by 0 days.

(21) Appl. No.: 09/414,167

(22) Filed: Oct. 8, 1999

(51) Int. Cl.[7] ................................................. B65G 47/24
(52) U.S. Cl. ............................................. 198/406; 198/640
(58) Field of Search .................................. 198/406, 640, 198/956, 400

(56) References Cited

U.S. PATENT DOCUMENTS

| | | | | |
|---|---|---|---|---|
| 3,282,399 | * | 11/1966 | Morton | 198/956 |
| 4,220,238 | * | 9/1980 | Shavit | 198/400 |
| 4,391,560 | * | 7/1983 | Fardin | 198/406 |
| 4,843,795 | * | 7/1989 | Shroyer | 198/400 |
| 5,058,725 | * | 10/1991 | Gamberini et al. | 198/406 |
| 5,934,443 | * | 8/1999 | Pardi et al. | 198/406 |

FOREIGN PATENT DOCUMENTS

| | | |
|---|---|---|
| 3-166023 | 7/1991 | (JP) . |
| 3-199896 | 8/1991 | (JP) . |
| 4-35831 | 3/1992 | (JP) . |
| 4-113113 | 10/1992 | (JP) . |
| 0611445 | 4/1994 | (JP) . |
| 09085541 | 3/1997 | (JP) . |
| 09085542 | 3/1997 | (JP) . |
| 11070424 | 3/1999 | (JP) . |

* cited by examiner

Primary Examiner—Joseph E. Valenza
(74) Attorney, Agent, or Firm—Foley & Lardner

(57) ABSTRACT

For handling elongate and flat workpieces flowing in a manufacturing line, two arrangements are disclosed, one being an arrangement including a workpiece posture changing device which changes the posture of each workpiece at the time when the workpiece is transmitted from a first conveyer to a second conveyer, and the other being an arrangement for bundling the workpiece flowing in the manufacturing line.

7 Claims, 15 Drawing Sheets

WORKPIECE HANDLING DEVICE

BACKGROUND OF THE INVENTION

1. Field of the Invention

The present invention relates in general to manufacturing lines for manufacturing heat exchangers used in automotive air conditioners, each heat exchanger comprising a plurality of parallel flat heat extending tubes arranged to constitute a rectangular mass, a plurality of outer fins alternatively arranged in the mass of the flat heat extending tubes and two header pipes connected to opposed sides of the mass. More particularly, the present invention relates to the heat exchanger manufacturing lines of a type which comprises a header pipe producing device which produces the header pipes by pressing or curling flat metal plates, a flat tube producing device which produces the flat heat exchanging tubes each including an elongate flat metal tube and an elongate inner metal fin installed in the flat tube, an outer fin producing device which produces the outer fins by corrugating an elongate metal plate, and assembling devices which produce the heat exchangers one after another by assembling the header pipes, the elongate flat tubes and the outer fins. More specifically, the present invention is concerned with workpiece handling devices arranged in the heat exchanger manufacturing line, which handle the flat heat exchanging tubes for assisting the operation of the above-mentioned producing and assembling devices.

2. Description of the Prior Art

In the heat exchanger manufacturing lines of the above-mentioned type, there are employed various handling devices for handling workpieces or flat tubes. One of the handling devices is a workpiece posture changing device which is arranged between first and second conveyers to change the posture of a workpiece, which has just released from the first conveyer, for properly putting it on the second conveyer. Another handling device is a workpiece bundling device which is arranged at a terminal position of a conveyer for bundling a certain number of the workpieces which have been conveyed thereto by the conveyer. However, some of the workpiece posture changing devices and the workpiece bundling devices hitherto proposed have failed to provide users with a satisfaction due to their insufficient handling efficiency.

SUMMARY OF THE INVENTION

It is therefore an object of the present invention to provide a workpiece posture changing device which can exhibit a satisfied handling efficiency.

It is another object of the present invention to provide a workpiece bundling device which can exhibit a satisfied handling efficiency.

According to a first aspect of the present invention, there is provided an arrangement for handling elongate and flat workpieces flowing in a manufacturing line. The arrangement comprises a first conveyer for conveying the workpieces in such a manner that workpieces on the first conveyer are oriented transversely relative to the first conveyer; a second conveyer arranged just downstream of the first conveyer for catching and conveying the workpieces which have been just released from the first conveyer, the second conveyer having an entrance end positioned below an exit end of the first conveyer; and a workpiece posture changing device positioned just downstream of the exit end of the first conveyer and just above the entrance end of the second conveyer, the workpiece posture changing device having, at a side facing the exit end of the first conveyer, a recess which momentarily catches a leading edge of each workpiece released from the first conveyer before the workpiece falls onto the entrance end of the second conveyer.

According to a second aspect of the present invention, there is provided an arrangement for bundling elongate and flat workpieces flowing in a manufacturing line. The arrangement comprises two tables horizontally arranged keeping a certain clearance therebetween; a conveying device for conveying the workpieces onto the two tables to make a mass of workpieces on the two tables; a tray feeding mechanism for feeding empty trays to a position below the two tables one after another; a tray lifting mechanism positioned below the two tables, the tray lifting mechanism lifting up the empty tray through the certain clearance to permit the tray to receive therein the mass of workpieces; a tray catching mechanism for catching the tray lifted up by the tray lifting mechanism and piling up a certain number of the trays to form a mass of piled trays; and a tray mass pushing mechanism for pushing the mass of piled trays to a certain rest position.

BRIEF DESCRIPTION OF THE DRAWINGS

Other objects and advantages of the present invention will become apparent from the following description when taken in conjunction with the accompanying drawings, in which:

FIGS. 4A and 4B are drawings showing steps for producing a flat tube, in which FIG. 4A is a perspective view of a semi-finished flat tube, and FIG. 4B is a sectional view of a finished flat tube;

DETAILED DESCRIPTION OF THE EMBODIMENTS

In the following, first and second embodiments 100 and 200 of the present invention will be described with reference to the accompanying drawings.

In the description, directional terms, such as "forward", "backward", "upstream", "downstream", "downward" and the like are used for ease of understanding the construction of the invention. Such terms are to be understood with respect to a direction in which workpieces 102 flow.

Figure 1:
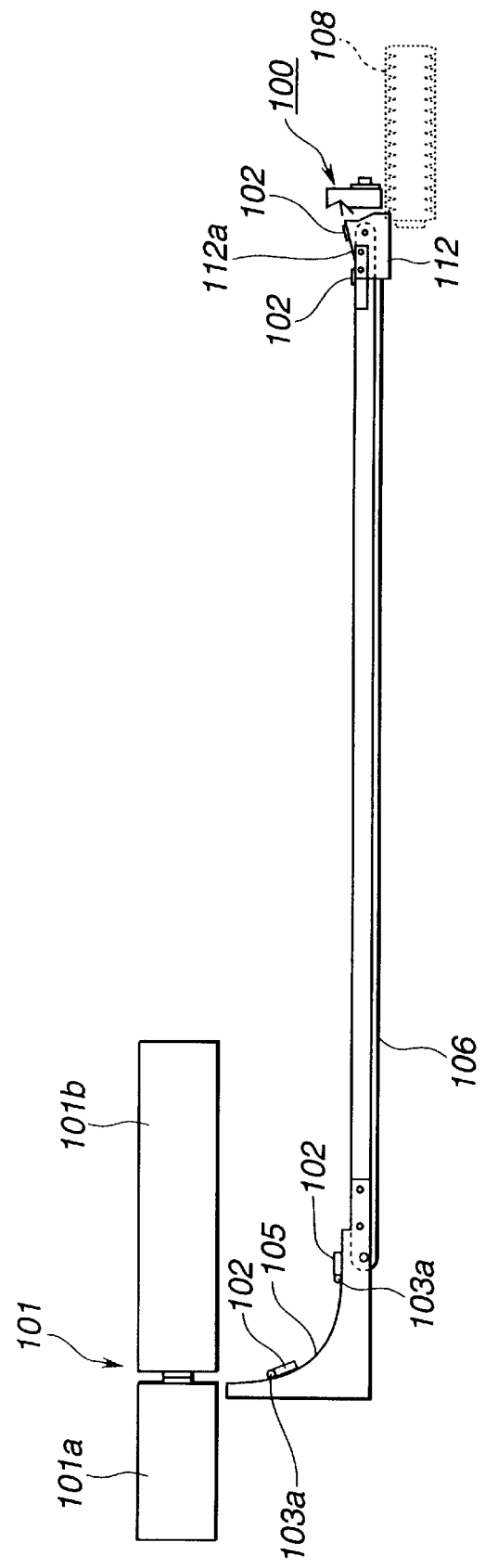
FIG. 1 is a schematically illustrated side view of a manufacturing line which employs therein a workpiece posture changing device of a first embodiment of the present invention.

Referring to FIGS. 1 to 4B, particularly FIG. 1, there is shown a workpiece posture changing device 100 of a first embodiment of the present invention, which is arranged in a manufacturing line of producing a condenser of an automotive air conditioner.

Figure 4:
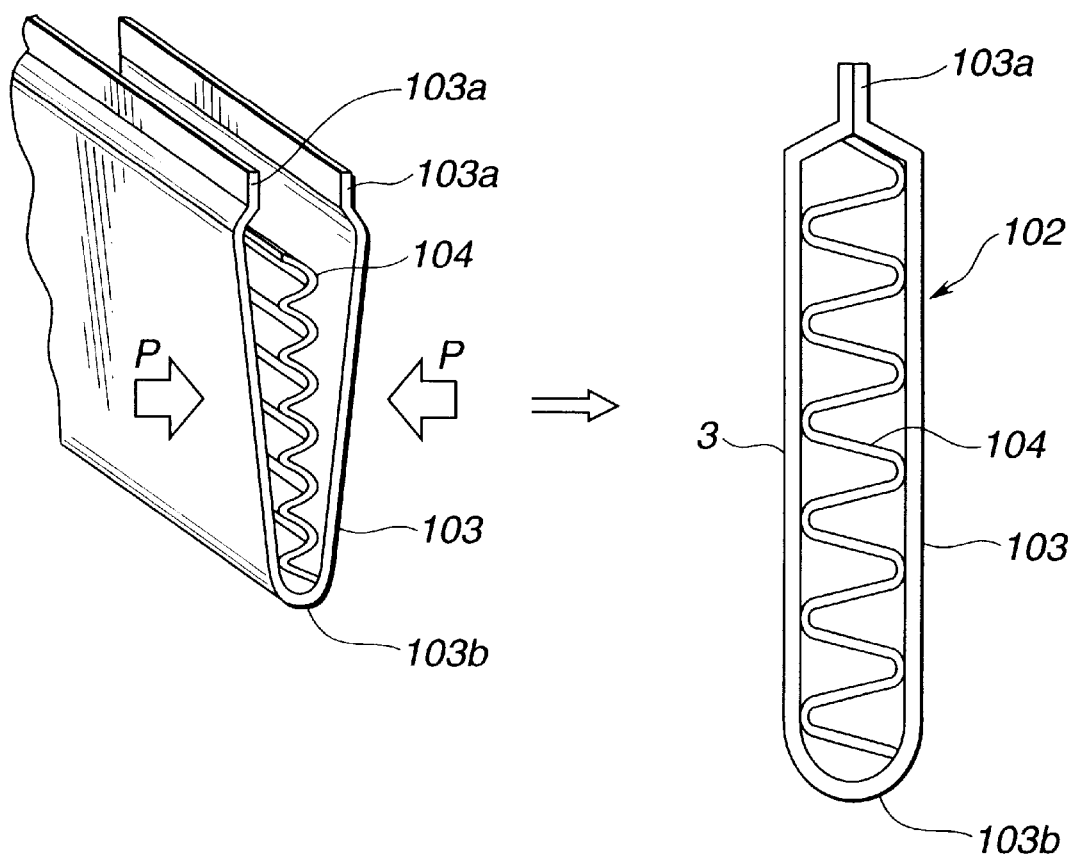

In FIG. 1, denoted by numeral 101 is a press machine for continuously producing flat tubes 102 used as essential elements of a core unit of the condenser. The flat tube 102 is shown in FIG. 4. As shown in FIG. 1, the press machine 101 comprises a fixed die 101a and a movable die 101b.

For producing the flat tube 102 by the press machine 101, the following production steps are carried out. That is, as is seen from FIGS. 1 and 4, a flat and elongate aluminum plate 103 is horizontally oriented and put between the two dies 101a and s 101b, and the movable die 101b is moved toward the fixed die 101a and then moved away from the fixed die 101a. With this, as is seen from FIG. 4A, the plate 103 is bent at its vertically middle portion 103b to form a V-bent member which has a generally V-shaped cross section. The V-bent member 103 has opposed upper ends 103a and 103a each being depressed toward each other. Then, an aluminum inner fin 104 is put into the V-bent member 103, and then the V-bent member 103 is tightly pressed by the two dies 101a and 101b with pressing forces "P" and "P" having, as is shown in FIG. 4B, the opposed upper ends 103a and 103a crimped. With this, the flat tube 102 is produced. Upon assembly of the condenser, a refrigerant flows in the flat tube 102. It is to be noted that after completion of the above-mentioned production steps, the same steps are carried out one after another for producing other flat tubes 102.

Referring back to FIG. 1, below the press machine 101, there is arranged a shooter 105 which has a concave upper surface for smoothly receiving the flat tubes 102 produced by the press machine 101. It is to be noted that when falling onto the concave upper surface of the shooter 105 from the press machine 101, the flat tube 102 takes such a posture that the crimped ends 103a and 103a thereof are directed rearward as is seen from FIG. 1. Behind the shooter 105, there is arranged a first conveyer 106 which has a front end connected to a rear portion of the shooter 105. Thus, after separating from the shooter 105, each flat tube 102 is automatically put on the first conveyer 106 and conveyed toward a rear end of the conveyer 106. During the conveying, the flat tubes 102 are transversely held on the conveyer 106 while keeping a constant pitch between every adjacent flat tubes 102.

Figure 3:
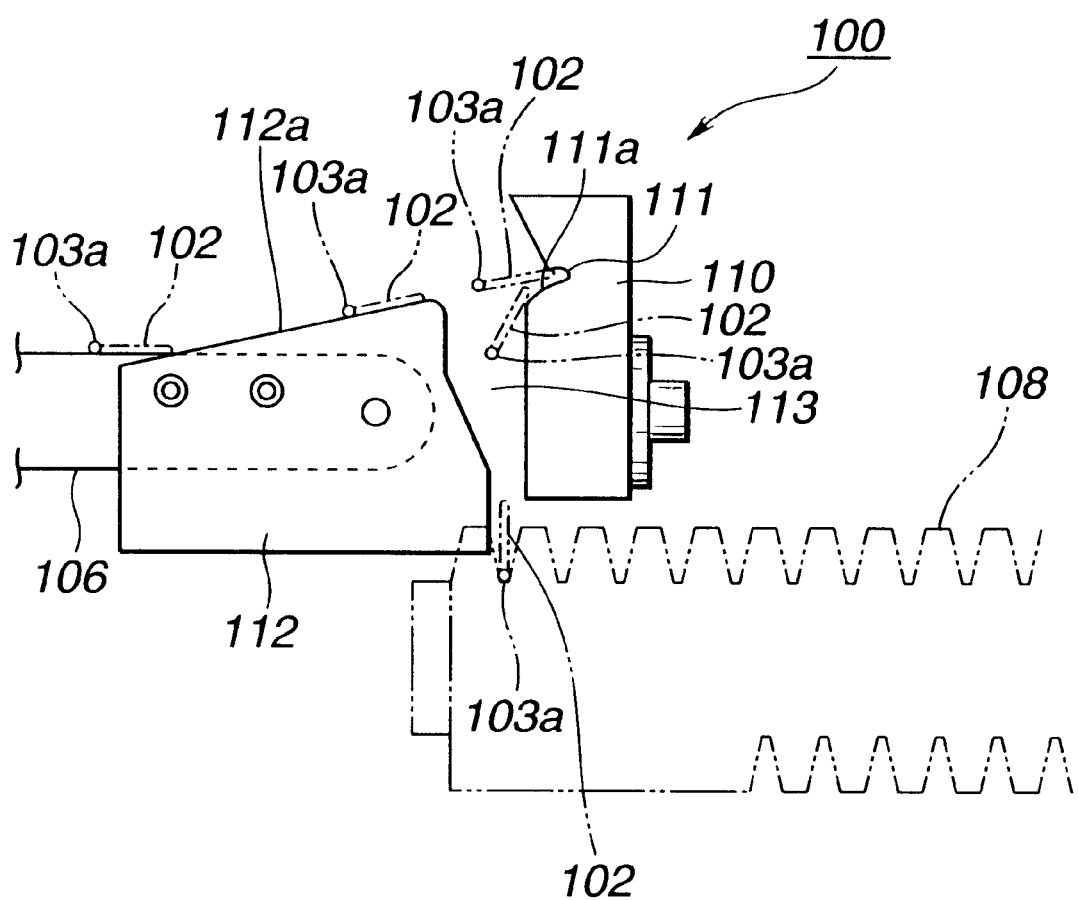
FIG. 3 is an enlarged side view of the essential portion of the workpiece posture changing device of the first embodiment.

As is seen from FIG. 3, the rear end of the first conveyer 106 is equipped with another shooter 112 for shooting the flat tubes 102 toward a desired direction. The shooter 112 comprises two identical plates each having a sloped upper edge 112a. As shown, the sloped upper edge 112a has a lower portion incorporated with the work surface of the first conveyer 106. Thus, when conveyed to the rear end of the first conveyer 106, the flat tubes 102 are automatically put on the sloped upper edges 112a of the shooter 112 and thrown away toward the desired direction.

Behind the rear end of the first conveyer 106, there is arranged the workpiece posture changing device 100. As will be described in detail hereinafter, the workpiece posture changing device 100 functions to turn the posture of the flat tube 102 by about 90 degrees during the time when the flat tube 102 is transmitted from the first conveyer 106 to a second conveyer 108.

Figure 2:
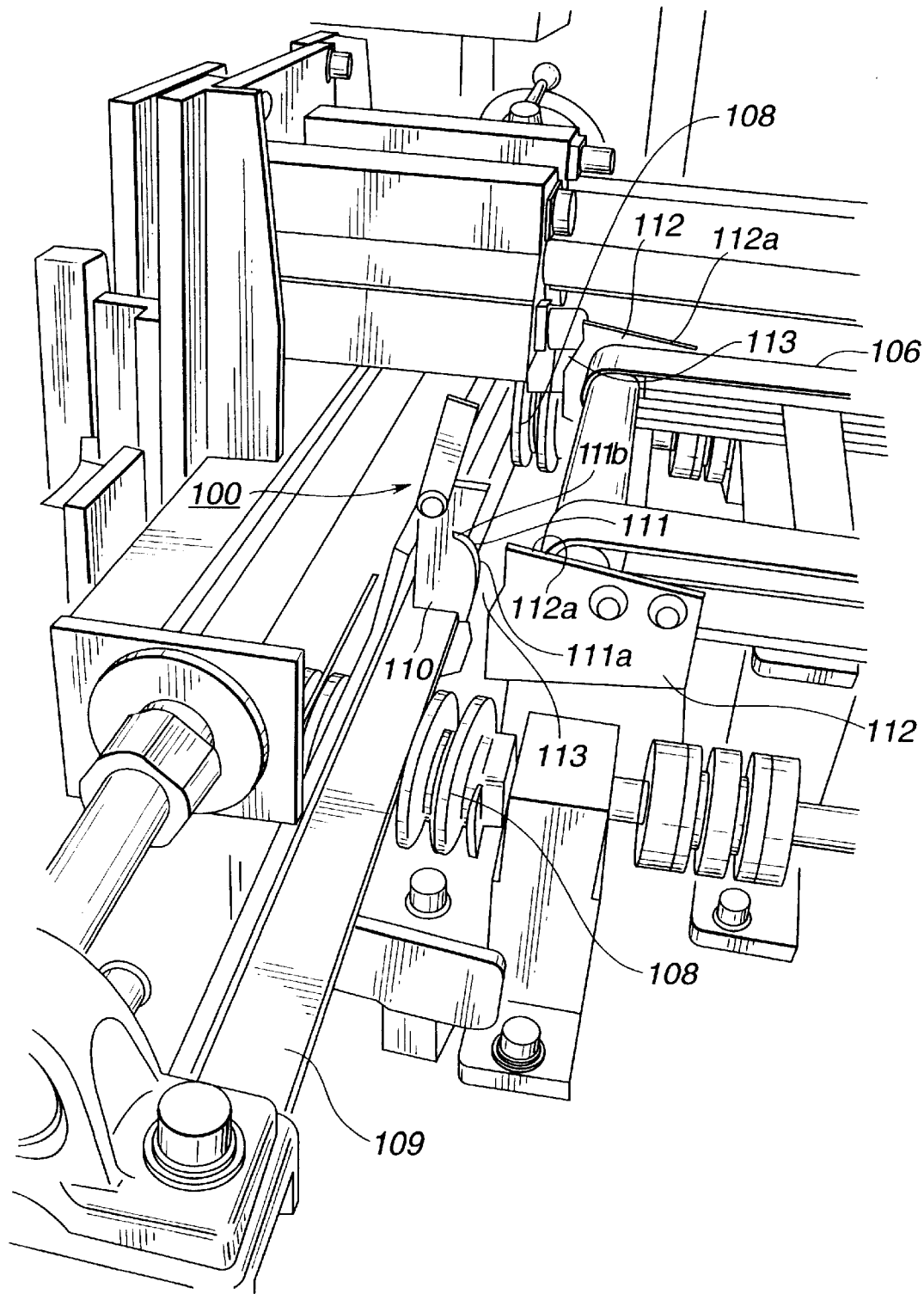
FIG. 2 is an enlarged perspective view of the workpiece posture changing device of the first embodiment with some members associated therewith.

As is seen from FIG. 2, the second conveyer 108 is a so-called screw conveyer which comprises a pair of screw rods 108 which extend in parallel with an axis of the first conveyer 106. Each screw rod 108 has a helical groove formed thereabout. Thus, when, with the two screw rods 108 rotating in the same direction, a flat tube 102 is put into synchronous front portions of the respective grooves of the screw rods 108, the flat tube 102 is conveyed toward the rear ends of the rods 108.

As is understood from FIGS. 2 and 3, the workpiece posture changing device 100 comprises two identical catch plates 110 and 110 which are arranged above the front or entrance portions of the screw rods 108 in a manner to face the rear or exit end of the first conveyer 6. That is, the catch plates 110 and 110 are so positioned as to catch or stop the flat tubes 102 which have been thrown away from the rear end of the first conveyer 106. More specifically, under operation of the first conveyer 106, the flat tubes 102 are thrown away one after another from the shooter 112 of the first conveyer 6 due to the inertia applied thereto.

As is seen from FIG. 2, the two catch plates 110 and 110 are mounted on a fixed frame 109 while keeping therebetween a certain distance which is smaller than the length of each flat tube 102.

As is seen from FIG. 3, each catch plate 110 is formed at its front edge a recess 111 whose lower edge 111a is convexly curved. It is to be noted that the recesses 111 of the catch plates 110 and 110 are positioned on an imaginary plane which is defined by the sloped upper edges 112a of the shooter 112.

Between the shooter 112 and the workpiece posture changing device 100, more specifically, between the two identical plates of the shooter 112 and the two catch plates 110 and 110 of the workpiece posture changing device 100, there is defined a workpiece guiding space 113 by which the flat tubes 102 are appropriately guided during falling from the recesses 111 toward the second conveyer 108.

In the following, operation of the workpiece posture changing device 100 of the first embodiment will be described with reference to FIG. 3.

As is described hereinabove, under operation of the first conveyer 106, the flat tubes 102 conveyed by the first conveyer 106 are thrown out from the shooter 112. The flat tubes 102 thrown out from the shooter 112 are thus forced to collide against the catch plates 110 and 110. That is, each flat tube 102 is forced to enter the recesses 111 of the catch plates 110 and 110 while directing the laterally middle bent portion 103b thereof toward the recesses 111. When the bent portion 103b of the flat tube 102 collides against bottoms 111b of the recesses 111, the flat tube 102 is pivoted down by its own weight and slides down along the convexly curved lower edges 111a of the recesses 111, and then, the flat tube 102 is dropped down toward the second conveyer 108 while being guided by the workpiece guiding space 113. And, finally, the flat tube 102 is put into the synchronously rotated front grooved portions of the screw rods 108. It is now to be noted that when the flat tube 102 is received by the screw rods 108, the same is so postured that the crimped end 103a thereof is directed downward.

As is understood from the foregoing description, the workpiece posture changing device 100 can assuredly change the posture of the flat tube 102 by about 90 degrees during the time when the flat tube 102 is transmitted from the first conveyer 106 to the second conveyer 108. The device 100 can be made simple in construction and compact in size. Due to provision of the grooves 111 of the catch plates 110 and 110, the posture changing of the flat tubes 102 is much assured. That is, by the grooves 111, the pivoting of each flat tube 102 by the own weight is smoothly achieved. Furthermore, due to provision of the workpiece guiding space 113, the falling of the flat tubes 102 toward the second conveyer 108 is smoothly made.

Figure 5:
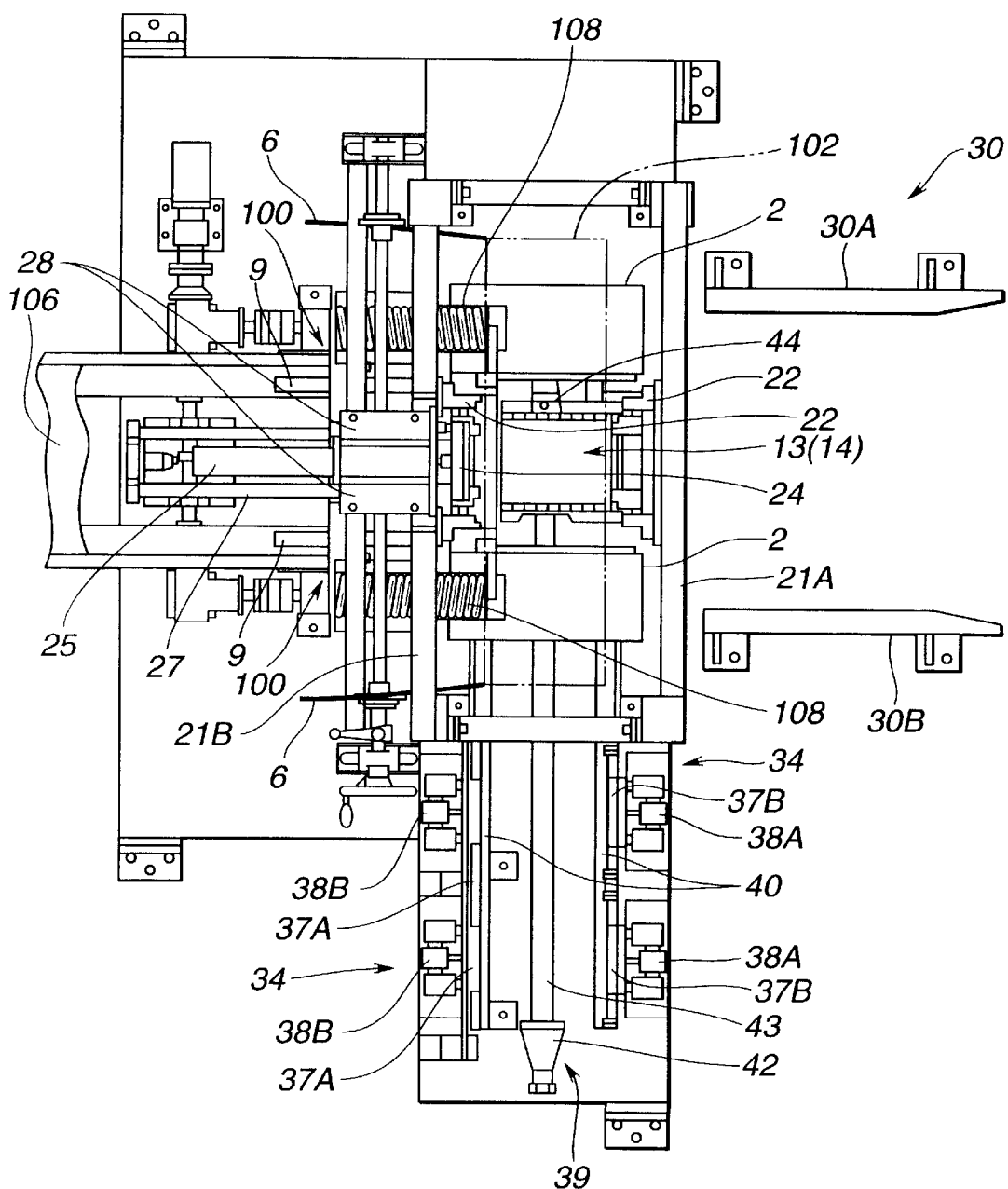
FIG. 5 is a plan view of a workpiece bundling device which is a second embodiment of the present invention.
Figure 6:
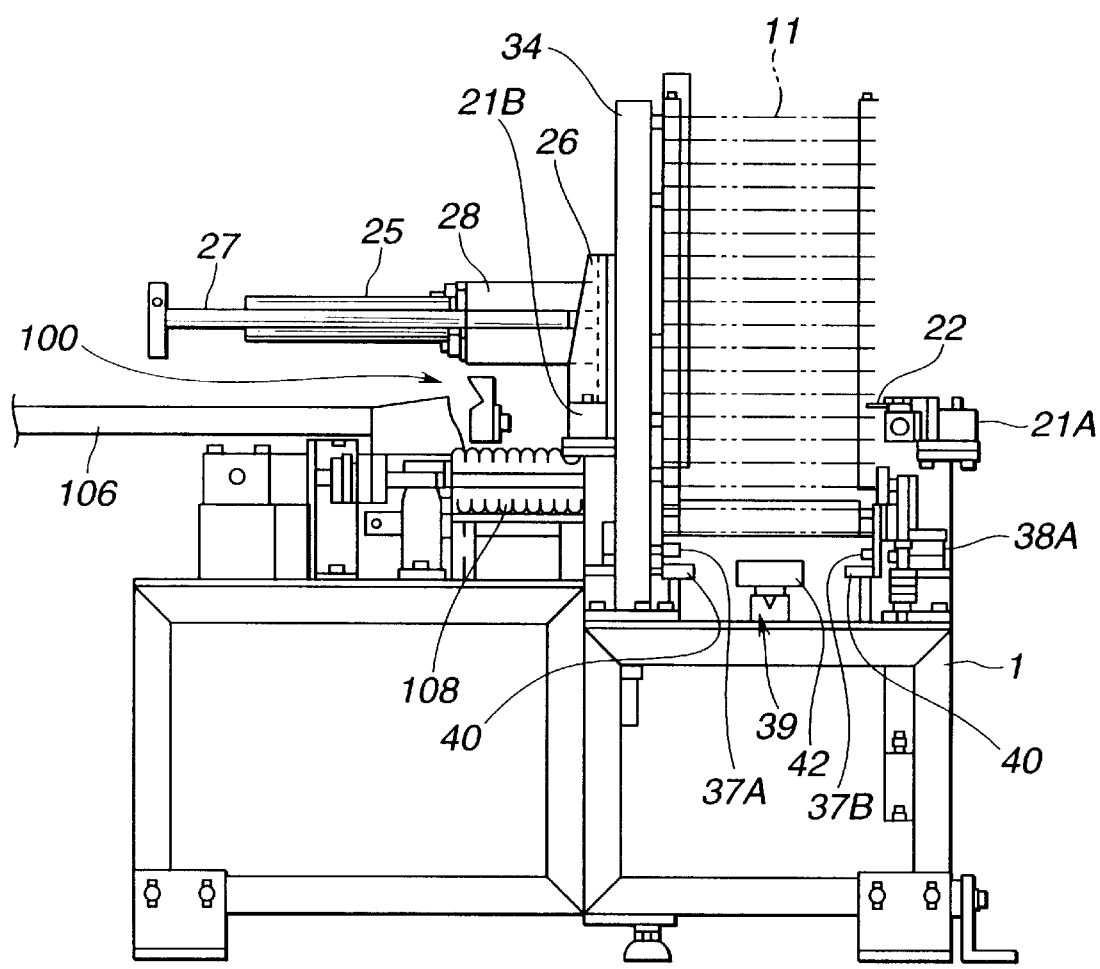
FIG. 6 is a side view of the workpiece bundling device of the second embodiment.
Figure 7:
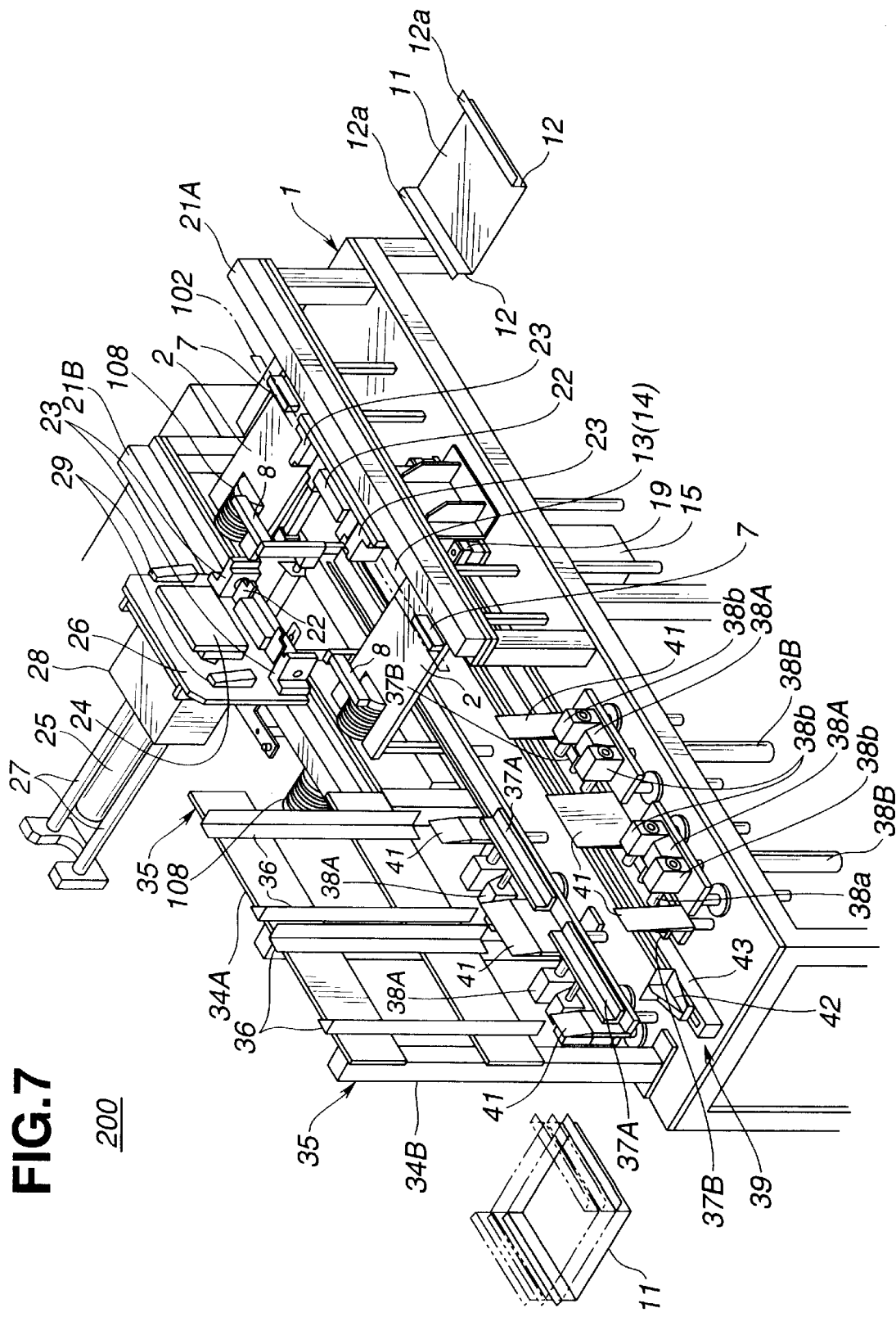
FIG. 7 is a perspective view of the workpiece bundling device of the second embodiment with some devices removed.

Referring to FIGS. 5 to 15, particularly FIGS. 5 to 7, there is shown a workpiece bundling device 200 which is a second embodiment of the present invention. It is to be noted that the workpiece bundling device 200 is positioned just downstream of the above-mentioned workpiece posture changing device 100.

As is best seen from FIG. 7, the workpiece bundling device 200 comprises a base stand 1 which is constructed of frame members. Two rectangular flat tables 2 and 2 are horizontally arranged on the base stand 1 keeping a certain distance therebetween. The tables 2 and 2 have at their rear ends respective rectangular cuts (no numeral) to which downstream ends of the above-mentioned screw rods 108 are exposed. The two screw rods 108 and 108 constitute the screw conveyer 108 (see FIG. 2) by which flat tubes 102 are conveyed to the tables 2 and 2 from the upstream end of the screw conveyer 108. As has been mentioned in the section of the first embodiment 100, during the conveyance of the flat tubes 102, each flat tube 102 stands vertically having the crimped end 103a thereof directed downward.

The positional relation of the above-mentioned first conveyer 106 and the workpiece posture changing device 100 relative to the workpiece bundling device 200 is clearly seen from FIGS. 5 and 6.

As is seen from FIG. 5, beside the two screw rods 108 and 108, there are arranged elongate guide plates 6 and 6 for the flat tubes 102, each guide plate 6 extending along the screw rod 108.

However, as shown, the distance between the two guide plates 6 and 6 gradually reduces as nearing the tables 2 and 2. With these guide plates 6 and 6, the flat tubes 102 are appropriately guided when conveyed by the screw conveyer 108 toward the tables 2 and 2. More specifically, the two guide plates 6 and 6 are so arranged as to put the flat tubes 102 on the tables 2 and 2 in such a manner that the center of each flat tube 102 is placed at a center between the tables 2 and 2.

Referring back to FIG. 7, the tables 2 and 2 are equipped at their downstream ends with respective stoppers 7. With these stoppers 7 and 7, the tables 2 and 2 can put or collect thereon a certain number (for example, one hundred) of flat tubes 102.

In order to allow the flat tubes 102 to stand vertically on the tables 2 and 2, a holding mechanism is employed.

The holding mechanism comprises two holding arms 8 and 8 which are moved fore-and-aft above the tables 2 and 2.

Figure 8:
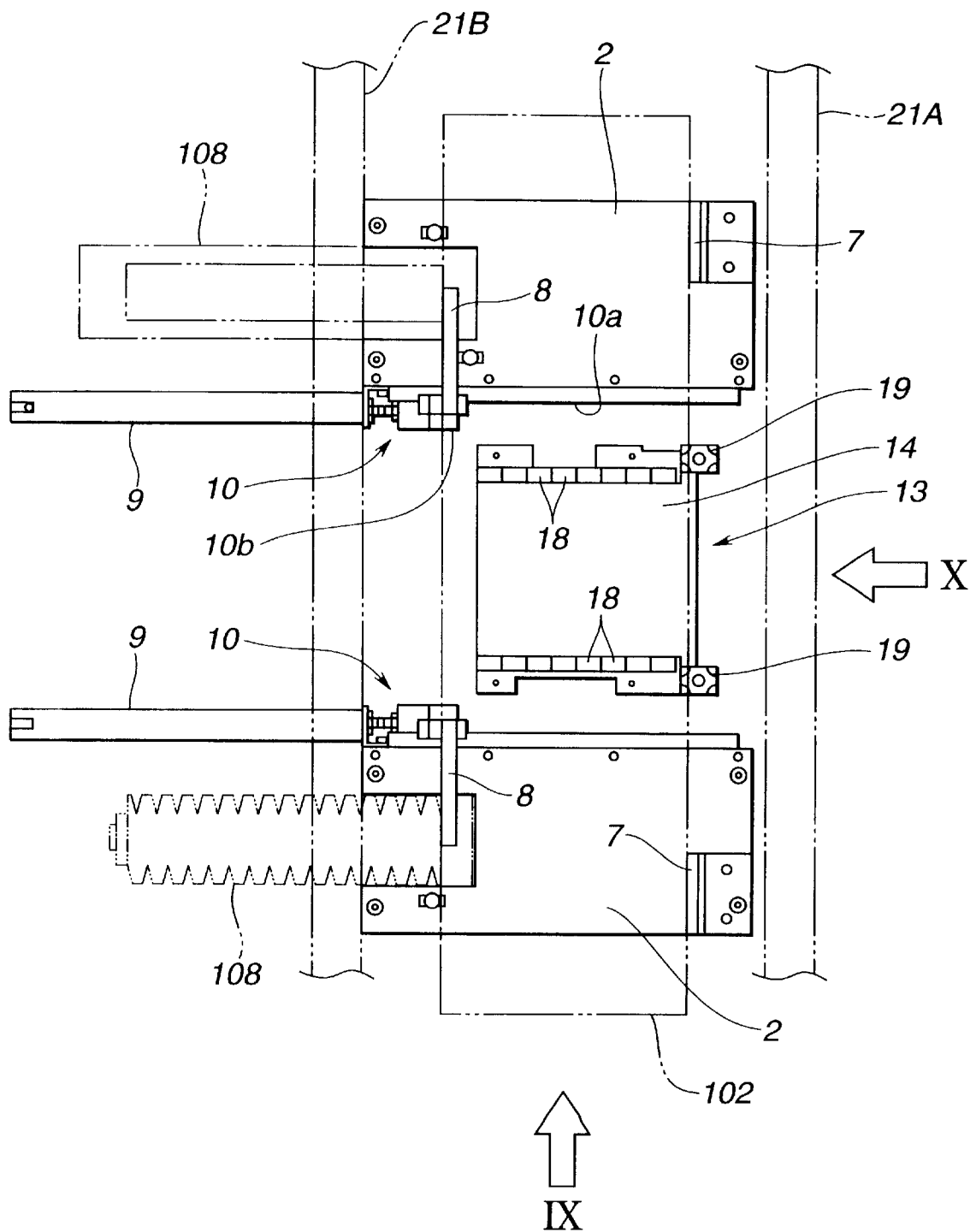
FIG. 8 is an enlarged plan view of a tray table of a tray lifting mechanism employed in the work piece bundling device of the second embodiment.
Figure 9:
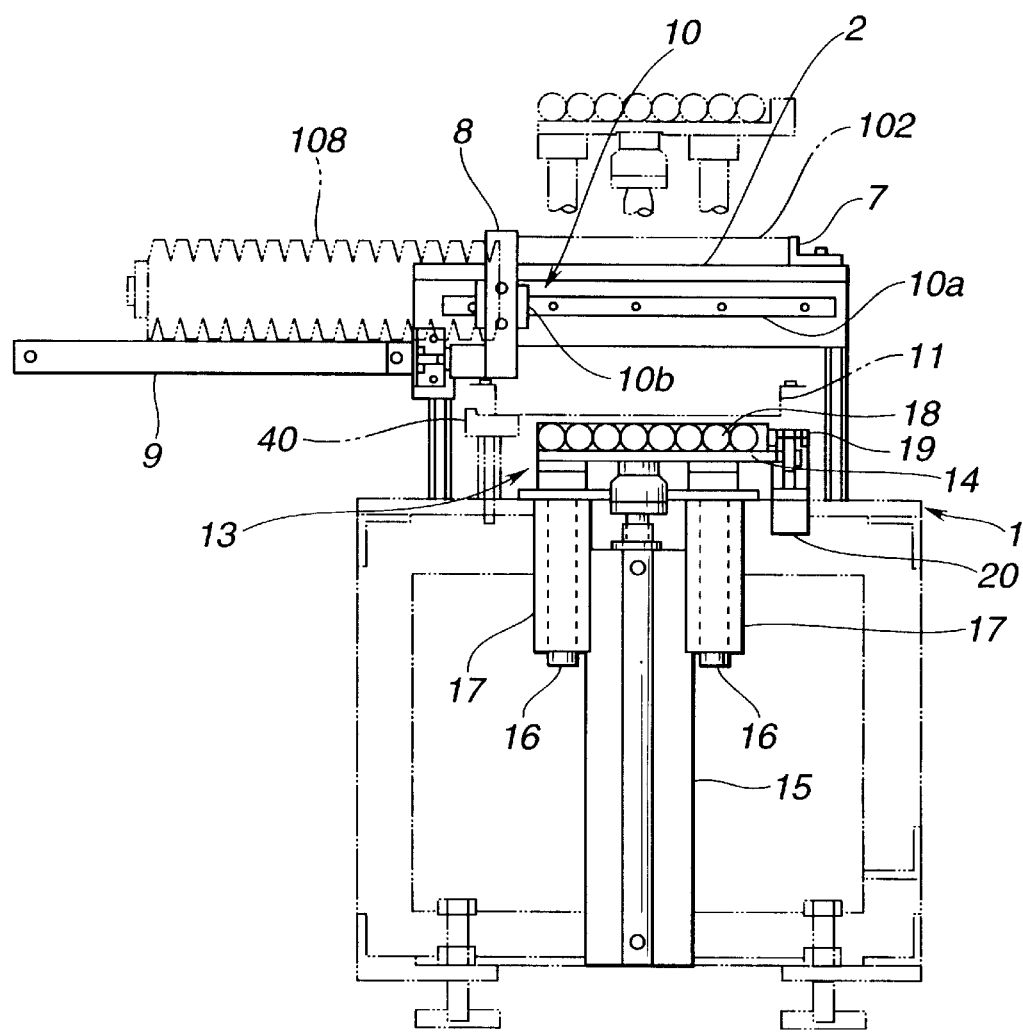
FIG. 9 is a view taken from the direction of the arrow "IX" of FIG. 8.

As is seen from FIGS. 8 and 9, for moving the two holding arms 8 and 8, two power cylinders 9 and 9 are provided, each having a piston connected to the corresponding holding arm 8. As is seen from FIGS. 8 to 10, the movement of each holding arm 8 is guided by a guide mechanism 10 which comprises a guide rail 10a which extends along an inner edge of the corresponding table 2 and a slider piece 10b which is connected to the holding arm 8. The slider pieces 10b are slidably engaged with the guide rails 10a and 10a and connected to leading ends of piston stems of the power cylinders 9 and 9.

The forward movement of the holding arms 8 and 8 is synchronized with the forward movement of the flat tubes 102 conveyed by the screw conveyer 108. That is, each time a flat tube 102 is released from the screw conveyer 108, the holding arms 8 and 8 advance a little to hold the released flat tube 102. With increase of number of the flat tubes 102 released from the screw conveyer 108, the holding arms 8 and 8 move toward the stoppers 7 and 7 to hold all of these released flat tubes 102 on the tables 2 and 2. When the holding arms 8 and 8 reach the stoppers 7 and 7, that is, when the flat tubes 102 accumulated on the tables 2 and 2 show a certain number (for example, one hundred), all of these flat tubes 102 are lifted up by an after-described tray lifting mechanism 13 thereby emptying the tables 2 and 2. Upon this, the holding arms 8 and 8 are returned back to their original or stand-by positions for carrying out a subsequent holding operation.

As is best seen from FIGS. 8 and 9, below and between the tables 2 and 2, there is arranged the tray lifting mechanism 13 which lifts up a rectangular tray 11 for receiving the above-mentioned all of the flat tubes 102 into the tray 11.

As is seen from FIG. 7, the tray 11 comprises a rectangular base portion, opposed side walls 12 and 12 and flanges 12a and 12a formed on the side walls 12 and 12.

Referring back to FIGS. 8 and 9, the tray lifting mechanism 13 comprises a power cylinder 15 and a rectangular tray table 14 vertically driven by the power cylinder 15. That is, the tray table 14 is mounted on a leading end of a piston stem of the power cylinder 15. The tray table 14 is sized to stably hold thereon the tray 11.

Figure 10:
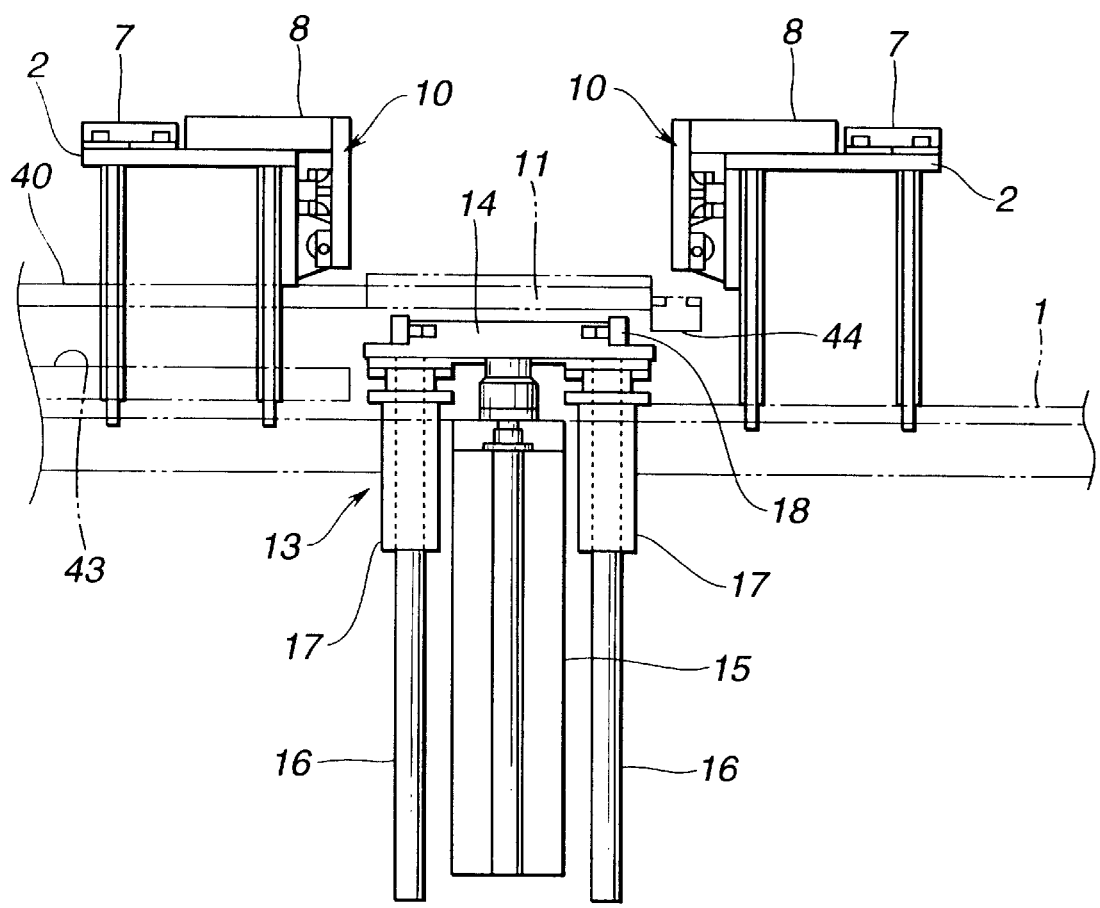
FIG. 10 is a view taken from the direction of the arrow "X" of FIG. 8.

As is seen from FIGS. 9 and 10, for smoothing the vertical movement of the table 14, there is employed a guide mechanism. The guide mechanism comprises two guide rods 16 and 16 fixed to the tray table 14 and two rod holders 17 fixed to the power cylinder 15. Each guide rod 16 is slidably engaged with the corresponding rod holder 17.

Figure 11:
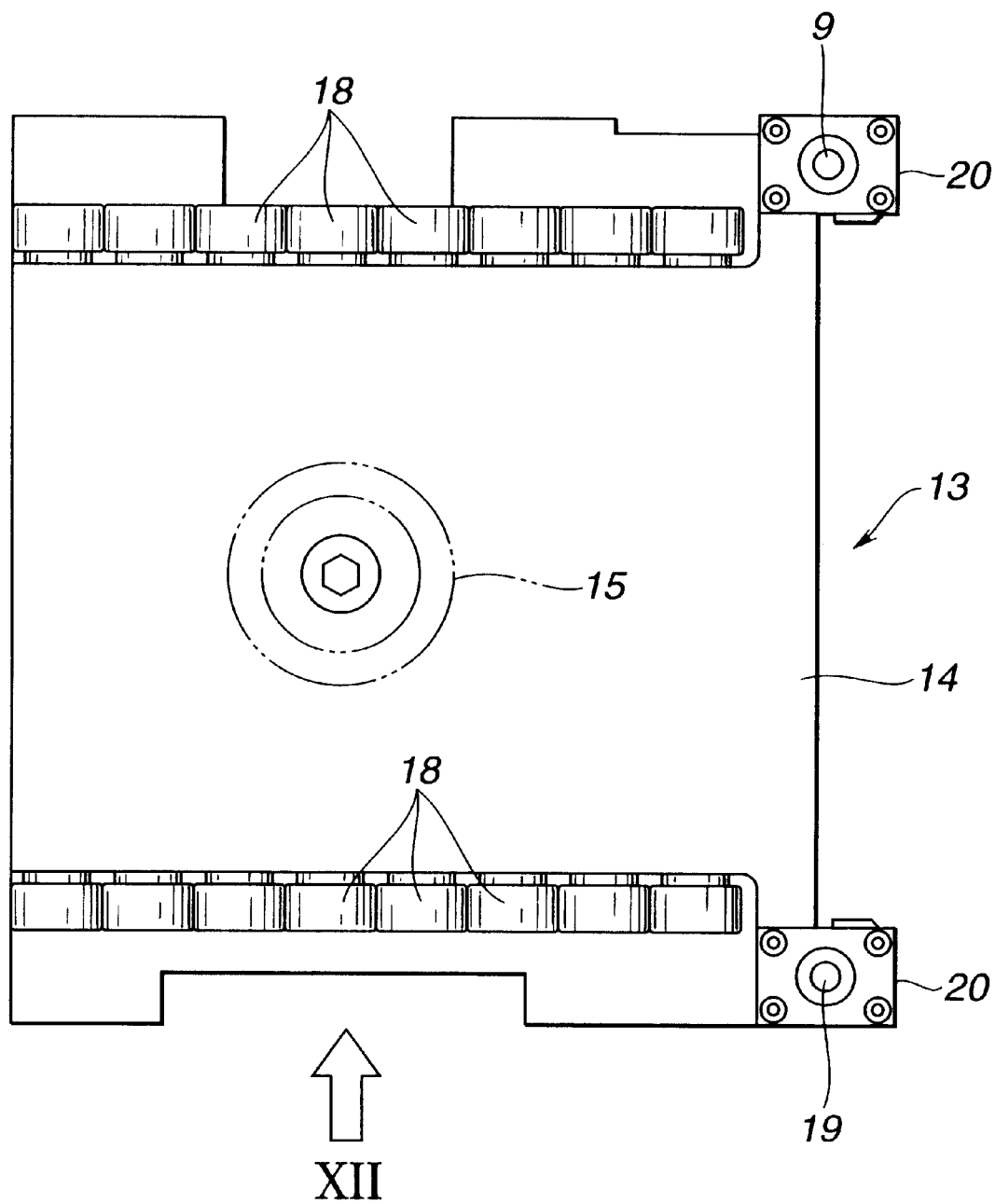
FIG. 11 is a plan view of the tray lifting mechanism employed in the workpiece bundling device of the second embodiment.

As is seen from FIGS. 8, 9 and 11, on both sides of the tray table 14, there are arranged two groups of rollers 18 and 18 respectively. More specifically, the rollers 18 of each group are aligned on an imaginary line which is in parallel with the axis of the screw conveyer 108. These rollers 18 and 18 are used for facilitating movement of the tray 11 toward an after-described tray collecting structure 30 (see FIG. 14).

Figure 12:
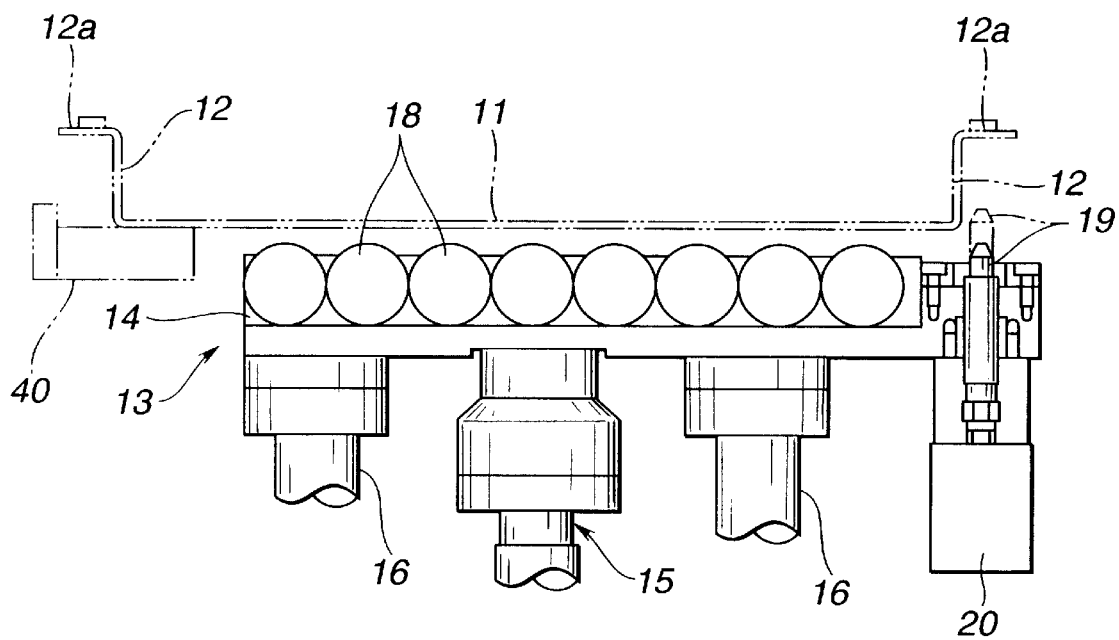
FIG. 12 is a a view taken from the direction of the arrow "XII" of FIG. 11.

As is seen from FIGS. 9, 11 and 12, near the downstream ones of the two groups of rollers 18 and 18, there is arranged a tray positioning mechanism which comprises two power cylinders 20 and 20 which are fixed to the tray table 14 and stopper pins 19 which are vertically driven by the power cylinders 20 and 20. That is, when the power cylinders 20 and 20 are energized, the stopper pins 19 and 19 are projected upward to serve as a stopper means for the tray 11. The function of the stopper pins 19 and 19 will be well understood from FIG. 12. That is, while the tray lifting mechanism 13 is operating to put the flat tubes 102 onto the tray 11, the stopper pins 19 and 19 are kept projected for suppressing movement of the tray 11. While, when the tray 11 is about to be moved to the tray collecting structure 30, the stopper pins 19 and 19 are drawn into the power cylinders 20 and 20 to permit the movement of the tray 11 toward the position.

Figure 13:
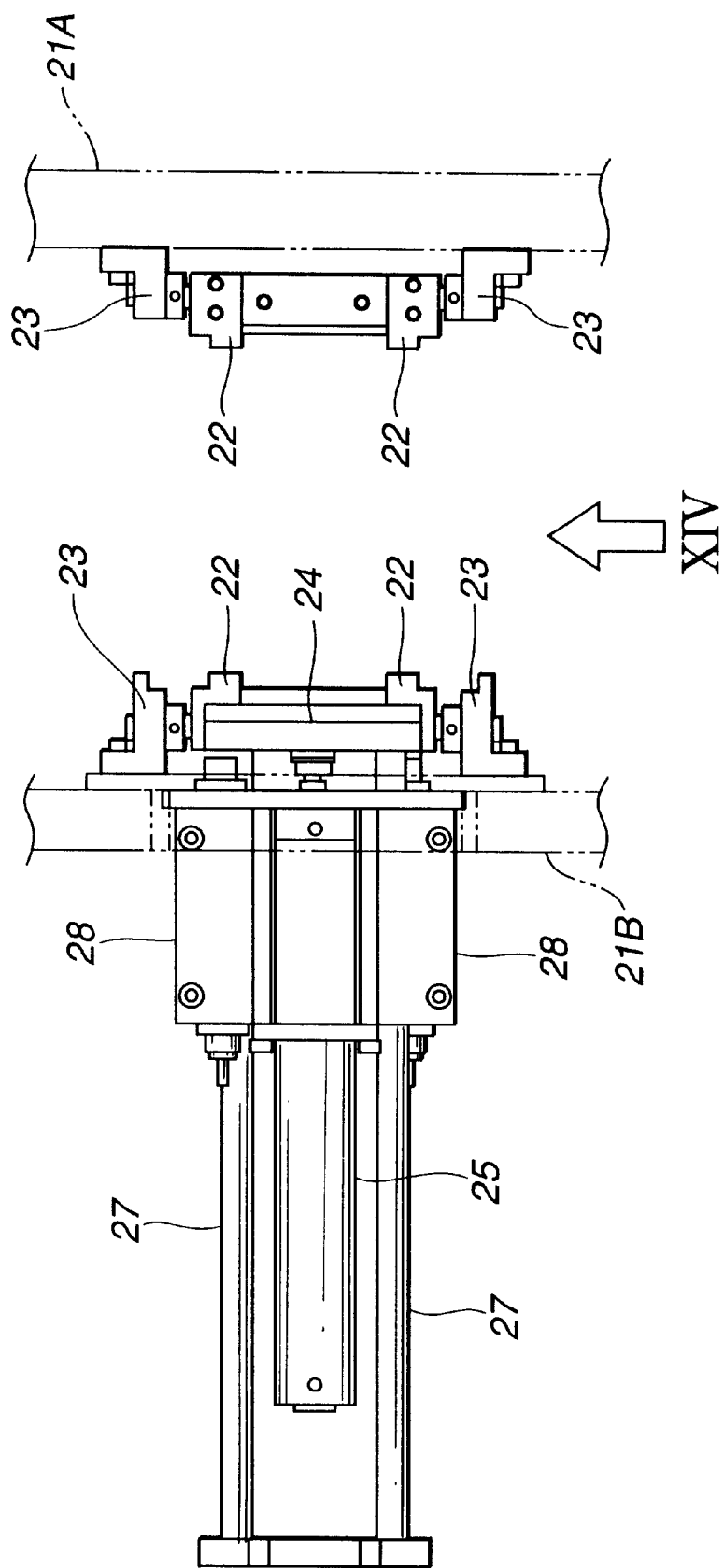
FIG. 13 is a plan view of a tray pushing mechanism employed in the workpiece bundling device of the second embodiment.
Figure 14:
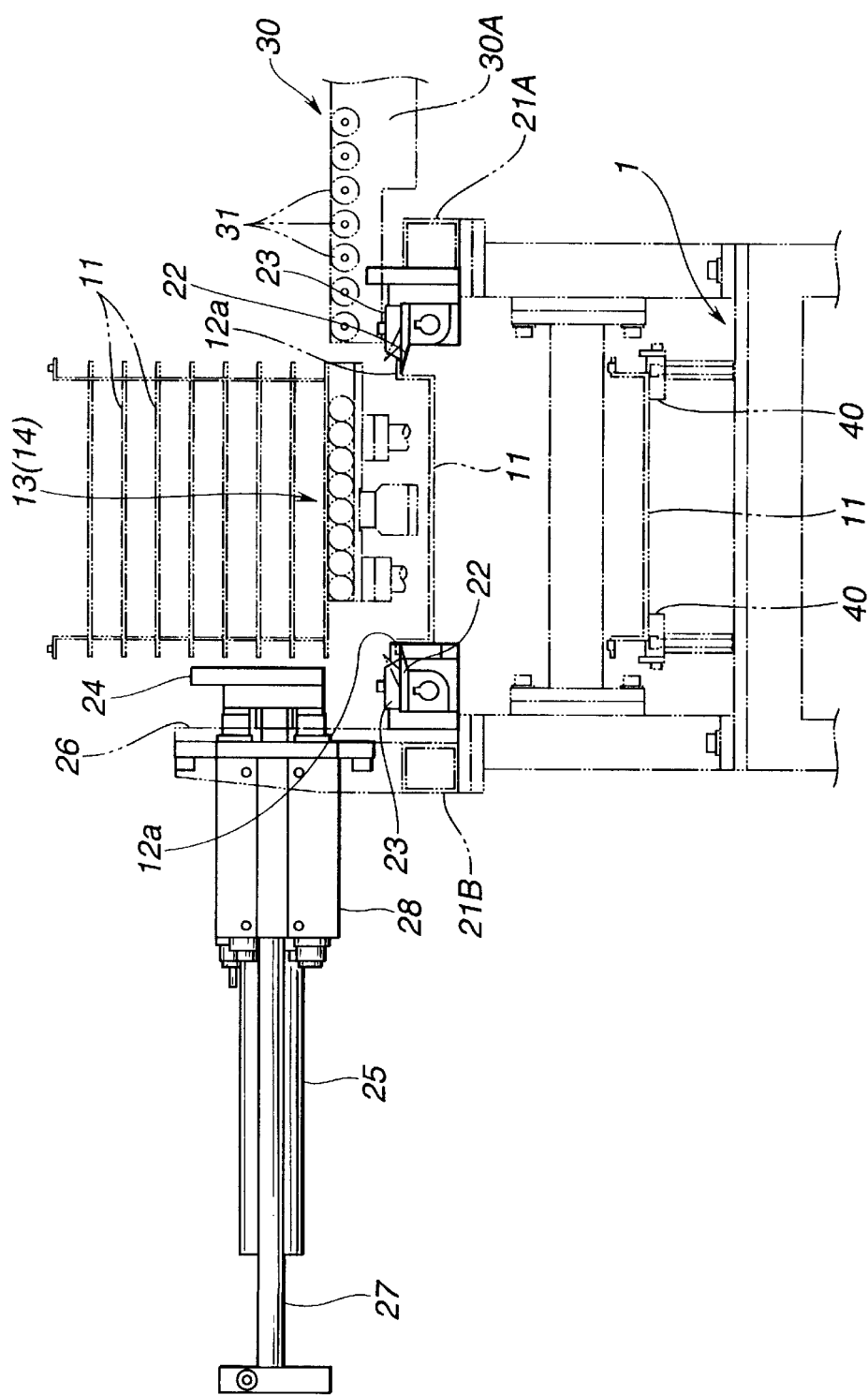
FIG. 14 is a view taken from the direction of the arrow "XIV" of FIG. 13.

As is seen from FIGS. 7, 13 and 14, above the tables 2 and 2, there are arranged two, that is, outside and inside frames 21A and 21B which extend in a direction perpendicular to the axis of the screw conveyer 108. Mounted on the two frames 21A and 21B is a tray catching mechanism which functions to catch the tray 11 which has been lifted up by the tray lifting mechanism 13.

As is best seen from FIG. 13, the tray catching mechanism comprises two pairs of brackets 23 which are respectively secured to the frames 21A and 21B. The paired brackets 23 have respective pivot arms 22 pivotally connected thereto. Each pivot arm 22 is pivotal between a horizontal position wherein, as is illustrated by a solid line in FIG. 14, the arm 22 is directed toward the opposite frame 21 and a vertical position wherein the arm 22 is directed upward. Although not shown in the drawings, a biasing spring is applied to each pivot arm 22 to bias the same toward the horizontal position. Thus, usually the pivot arms 22 assume the horizontal positions due to the work of the biasing springs. While, when, during upward movement of the tray 11 by the tray lifting mechanism 13, the tray 11 collides against lower surfaces of the pivot arms 22, these pivot arms 22 are forced to pivot upward against the force of the biasing springs and finally permit passing of the tray 11 therethrough as will be understood from the positions of the pivot arms 22 illustrated by solid lines in FIG. 14. Once this passing is completed, the pivot arms 22 are turned back to the horizontal positions. Thus, when thereafter the tray lifting mechanism 13 lowers the trays 11, the tray 11 becomes supported at its flanges 12a by the pivot arms 22, as is seen from FIG. 14.

Referring back to FIG. 7, on the inside frame 21B, there is mounted a tray mass pushing mechanism which functions to push a mass of the trays 11, which is kept supported by the pivot arms 22, toward the tray collecting structure 30 (see FIG. 14) which is positioned beside the outside frame 21.

As is seen from FIGS. 7 and 14, the tray mass pushing mechanism comprises a back plate 26 secured to the inside frame 21B, a power cylinder 25 secured to the back plate 26 and a pushing plate 24 driven by a piston of the power cylinder 25. That is, upon energization of the power cylinder 25, the pushing plate 24 is moved toward the outside frame 21A to push the tray 11.

As is seen from FIGS. 7, 13 and 14, for smoothing the movement of the pushing plate 24, a guide mechanism is employed which comprises a pair of guide rods 27 secured to the pushing plate 24 and rod holders 28 secured to the power cylinder 25. The guide rods 27 are slidably held by the rod holders 28.

As is seen from FIGS. 7 and 14, the back plate 26 of the tray mass pushing mechanism has a lower portion sandwiched between the inside frame 21B and the inside paired brackets 23 of the tray catching mechanism.

As is seen from FIG. 7, the back plate 26 is provided at lateral sides thereof with holding pieces 29 and 29 which function to hold a back side of the mass of the flat tubes 102 in the lifted up tray 11.

As will be seen from FIG. 14, in operation of the workpiece bundling device 200, a plurality of trays 11 are piled on the pivot arms 22 due to subsequent insertion of a new tray 11 into a space below the mass of the piled trays 11. When the number of the piled trays 11 comes to a certain value, and thus, when, due to operation of the tray lifting mechanism 13, the mass of the piled trays 11 comes up to show a certain height as is shown in FIG. 14, the pushing plate 24 of the tray mass pushing mechanism pushes the mass toward the tray collecting structure 30.

Figure 15:
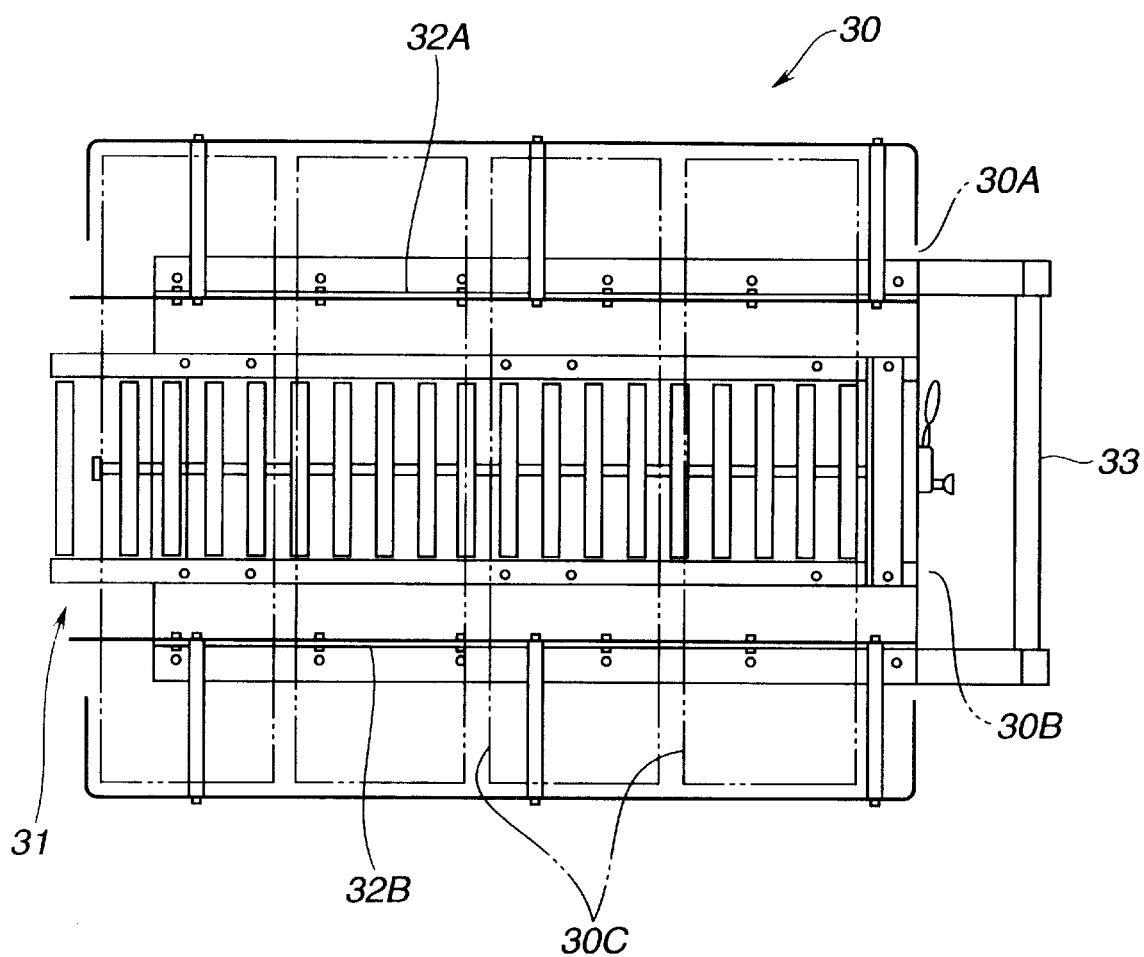
FIG. 15 is a plan view of a tray collecting structure employed in the workpiece bundling device of the second embodiment.

As is seen from FIGS. 5, 14 and 15, the tray collecting structure 30 comprises two horizontal frames 30A and 30B. On the frames 30A and 30B, there is mounted a base structure 30C which carries thereon a roller conveyer 31 and a tray stopper 33. Extending along the roller conveyer 31 are guide rails 32A and 32B for guiding the movement of the mass of the piled trays 11 to a right position. When coming to the right position, the mass of the piled trays 11 abuts against the tray stopper 33.

Referring back to FIG. 7, on the other side of the base stand 1, there are arranged two tray feeding mechanisms 34A and 34B and a tray moving mechanism 39. Each tray feeding mechanism 34A or 34B functions to feed the tray lifting mechanism 13 with empty trays one after another. That is, when one tray feeding mechanism 34A or 34B exhausts the empty trays 11 piled thereon, the other tray feeding mechanism 34B or 34A starts the tray feeding. The tray moving mechanism 39 functions to move one empty tray 11 to the above-mentioned tray lifting mechanism 13.

Since the two tray feeding mechanisms 34A and 34B are the same in construction, only the mechanism 34A will be described for facilitation of the description.

The tray feeding mechanism 34A comprises a tray stand 35 which has two vertically extending rails 36 secured thereto, and two tray holders 37A and 37B which are arranged near a lower part of the tray stand 35. The two tray holders 37A and 37B function to support the lowermost one of the piled empty trays 11. More specifically, the tray holders 37A and 37B support the flanges 12a of the lowermost tray 11.

The insider and outside tray holders 37A and 37B are horizontally driven by power cylinder mechanisms 38A. That is, due to function of the power cylinder mechanism 38A, the inside and outside tray holders 37A and 37B can move toward and away from each other. The movement of the tray holders 37A and 37B is smoothed by a guide mechanism which comprises a guide rod 38a and a slide guide 38b. These two members 38a and 38b are slidably engaged.

The outside tray holder 37B is vertically driven by another power cylinder mechanism 38B. That is, due to incorporated operation of the two power cylinder mechanisms 38A and 38B, the tray feeding mechanism 34A or 34B establishes a tray holding operation.

Below the inside and outside tray holders 37A and 37B, there extend two guide rails 40 each extending to the above-mentioned tray lifting mechanism 13.

When, with the empty trays 11 piled on the tray holders 37A and 37B, the outside tray holder 37B is moved away from the inside tray holder 37A by a certain distance by the power cylinder mechanism 38A, the lowermost one of the mass of the piled trays 11 is released from the tray holders 37A and 37B and thus dropped onto the guide rails 40.

Each guide rail 40 is provided with guide plates 41 by which the piled empty trays 11 are snugly and neatly put on the tray holders 37A and 37B.

The tray moving mechanism 39 functions to move the released lowermost tray 11 on and along the guide rails 40 to the tray lifting mechanism 13. During this movement, the tray lifting mechanism 13 keeps the tray table 14 thereof at the lower position to permit putting of the tray 11 onto the tray table 14. The tray moving mechanism 39 comprises generally a guide rail 43 which extends along the guide rails 40 and a moving plate 42 which moves along the guide rail 43. Although not shown, the moving plate 42 is driven by a power cylinder mechanism. As is understood from FIG. 10, when, due to operation of the power cylinder mechanism, the moving plate 42 moves the released empty tray 11 to the tray table of the tray lifting mechanism 13, the tray 11 abuts against a stopper 44 which is fixed to the tray table 14.

In the following, operation of the workpiece bundling device 200 will be described with reference to the drawings, particularly FIG. 7.

Each time a flat tube 102 is released from the screw conveyer 108, the holding arms 8 and 8 advance a little to hole the released flat tube 102. With increase of number of the flat tubes 102 released from the screw conveyer 108, the holding arms 8 and 8 move toward the stoppers 7 and 7 to hold all of these released flat tubes 102 on the tables 2 and 2. It is to be noted that during this flat tube feeding operation, the tray table 14 of the tray lifting mechanism 13 assumes its lower position, that is, the position below the tables 2 and 2.

During the flat tube feeding operation of the screw conveyer 108, the tray holders 37A and 37B of the tray feeding mechanism 34A or 34B are moved away from each other to drop the lowermost tray 11 (or first empty tray 11) of the mass of the piled empty trays 11 onto the guide rails 40 and due to operation of the tray moving mechanism 39, the first empty tray 11 is shifted to the position just above the tray table 14 of the tray lifting mechanism 13.

When the flat tubes 102 accumulated on the tables 2 and 2 show a certain number (for example, one hundred), the tray lifting mechanism 13 is operated to lift up the tray table 14 and thus put the first empty tray 11 on the tray table 14. Due to the lifting of the first tray 11 between the tables 2 and 2, all of the accumulated flat tubes 102 on the tables 2 and 2 are received by the tray 11.

As is seen from FIG. 14, further lifting of the first tray 11 by the tray lifting mechanism 13 causes the flanges 12a of the first tray 11 to pass up through the pivot arms 22 of the tray catching mechanism while pivoting the pivot arms 22 upward. Upon completion of passing of the flanges 12a through the pivot arms 22, the pivot arms 22 are pivoted down to assume the horizontal position. Thereafter, the tray lifting mechanism 13 is operated to lower the tray table 14. With this, the first tray 11 having all of the flat tubes 102 received therein becomes supported at its flanges 12a by the horizontal pivot arms 22.

As is understood from FIG. 7, when the tray table 14 of the tray lifting mechanism 13 is lowered to a certain lower position, the holding arms 8 and 8 are instantly returned back to the original position or stand-by position for dealing with a subsequent flat tube accumulation operation. Of course, during the subsequent flat tube accumulating operation, the tray moving mechanism 39 brings a second empty tray 11 to the position just above the lowered tray table 14 of the tray lifting mechanism 13. Thereafter, the second empty tray 11 is lifted up by the tray lifting mechanism 13 in the same manner as that mentioned hereinabove and thus, the second tray 11 receives therein another mass of the flat tubes 102. The second tray 11 is finally supported at its flanges 12a by the pivot arms 22 supporting thereon the first tray 11.

When the above-mentioned operation is repeated for certain times, a plurality of trays 11 are piled on the pivot arms 22 of the tray catching mechanism.

When, as is seen from FIG. 14, the number of the piled trays 11 shows a certain value, and thus, when, due to operation of the tray lifting mechanism 13, the mass of the piled trays 11 is brought to a certain height, the pushing plate 24 of the tray mass pushing mechanism pushes the mass of the piled trays 11 to the tray collecting structure 30. The movement of the mass toward the tray collecting structure 30 is smoothly made by the provision of the two groups of rollers 18 and 18 on the tray table 14.

As is described hereinabove, in the workpiece bundling device of the second embodiment 200, a certain number of flat tubes 102 can be put onto the tables 2 and 2 while standing vertically. Thereafter, the mass of the flat tubes 102 is received by the tray 11 lifted up by the tray lifting mechanism. Then, the tray filled with the flat tubes 102 is held by the pivot arms 22 of the tray catching mechanism. By repeating the above-mentioned operation, a certain number of trays 11 are piled on the pivot arms 22 of the tray catching mechanism. Upon this, the tray mass pushing mechanism pushes the mass of the piled trays 11 to the tray collecting structure 30.

During this, the tray feeding mechanism feeds empty trays to the tray lifting mechanism one after another.

Although the invention has been described above by reference to certain embodiments of the invention, the invention is not limited to the embodiments described above. Modifications and variations of the embodiments described above will occur to those skilled in the art, in light of the above teachings.

What is claimed is:

1. An arrangement for handling elongate and flat workpieces flowing in a manufacturing line, comprising:
   a first conveyer for conveying the workpieces in such a manner that workpieces on said first conveyer are oriented transversely relative to the first conveyer;
   a second conveyer arranged just downstream of said first conveyer for catching and conveying the workpieces which have been just released from said first conveyer, said second conveyer having an entrance end positioned below an exit end of said first conveyer; and
   a workpiece posture changing device positioned just downstream of said exit end of said first conveyer and just above said entrance end of said second conveyer, said workpiece posture changing device having, at a side facing the exit end of said first conveyer, a recess which momentarily catches a leading edge of each workpiece released from said first conveyer before the workpiece falls onto the entrance end of said second conveyer.

2. An arrangement as claimed in claim 1, in which said work piece posture changing device comprises two identical catch plates each having the recess.

3. An arrangement as claimed in claim 2, in which the recess of each catch plates has a convexly curved lower edge to smooth the falling of each workpiece onto the entrance end of said second conveyer.

4. An arrangement as claimed in claim 1, in which said first conveyer is provided at the exit end thereof with a shooter for shooting the workpieces toward the recess of said workpiece posture changing device.

5. An arrangement as claimed in claim 4, in which said shooter comprises two identical plates each having a sloped upper edge.

6. An arrangement as claimed in claim 5, in which the recess of said workpiece posture changing device is positioned on an imaginary plane which is defined by the sloped upper edges of said shooter.

7. An arrangement as claimed in claim 1, in which said second conveyer is a screw conveyer including a pair of screw rods which extend in parallel with an axis of said first conveyer, each screw rod having a helical groove formed thereabout.

* * * * *